United States Patent [19]

Kobayashi et al.

[11] Patent Number: 5,538,414
[45] Date of Patent: Jul. 23, 1996

[54] APPARATUS FOR SHAPING ELONGATED BAR-SHAPED BREAD DOUGH PIECES

[75] Inventors: Mikio Kobayashi; Tamotsu Kaneko, both of Tochigi-ken, Japan

[73] Assignee: Rheon Automatic Machinery Co., Ltd., Tochigi-ken, Japan

[21] Appl. No.: 399,153

[22] Filed: Mar. 2, 1995

[30] Foreign Application Priority Data

Mar. 4, 1994 [JP] Japan ................... 6-060217

[51] Int. Cl.⁶ ............... A21D 6/00; B29C 53/00
[52] U.S. Cl. ............. 425/321; 425/335; 425/364 R; 425/371; 426/501
[58] Field of Search ................. 426/501, 502, 426/517; 425/371, 373, 391, 321, 335, 364 R

[56] References Cited

U.S. PATENT DOCUMENTS 3,121,406  2/1964  Kieffaber ................ 425/371
3,806,298  4/1974  Remensperger ........... 425/371
4,410,474  10/1983  Ahrweiler .............. 425/371

*Primary Examiner*—George Yeung
*Attorney, Agent, or Firm*—Limbach & Limbach

[57] ABSTRACT

A method and apparatus is provided for shaping elongated bar-shaped bread dough pieces. In and by this method and apparatus a bread dough piece, namely, a bread dough sheet, a divided bread dough mass, or a preshaped bread dough roll, is subjected to a first rotation, thereby pressing and rolling it in a first gap defined by a conveyor and a pressing belt or a pressing board that faces it, while being conveyed downstream, so as to shape an elongated bar-shaped bread dough piece. This elongated bar-shaped bread dough piece is then fed into a second gap defined by an upper face that comprises a pressing belt or pressing board and a lower face that faces it and comprises a conveyor, a pressing belt or a pressing board, and is subjected to a second rotation that is in a direction reverse to that of the first rotation, thereby shaping a further elongated bar-shaped bread dough piece with a straight wound-dough end.

6 Claims, 6 Drawing Sheets

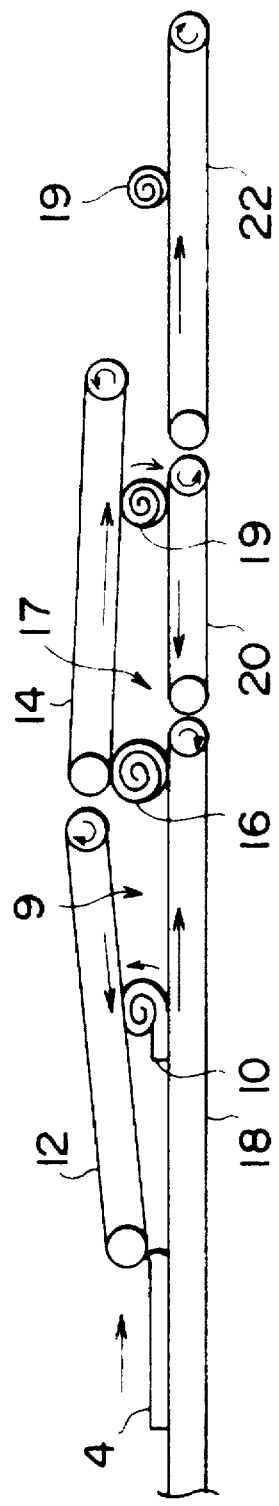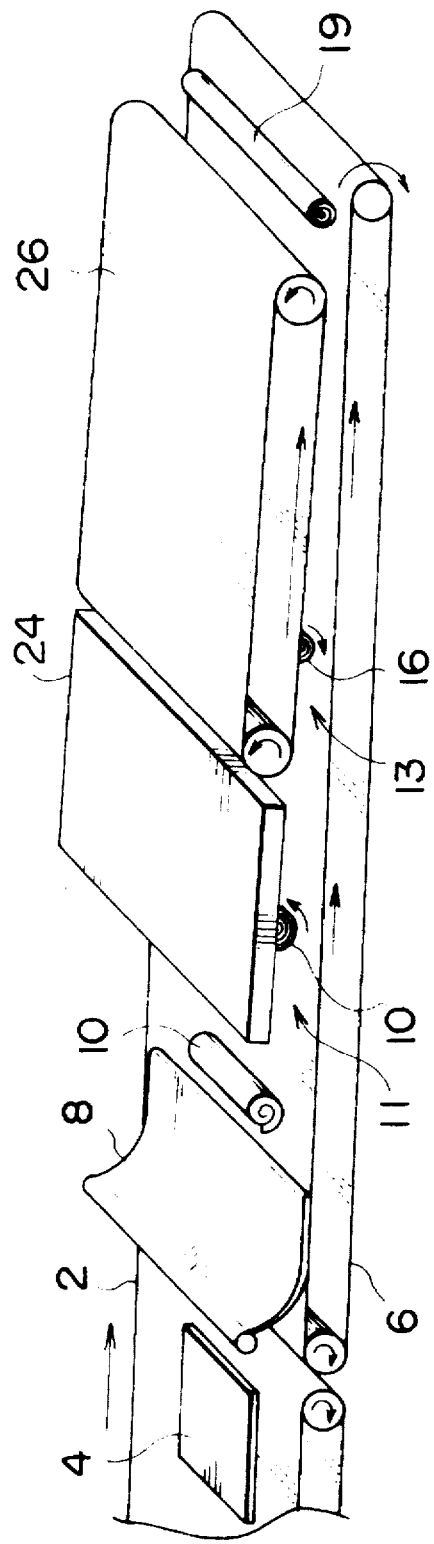

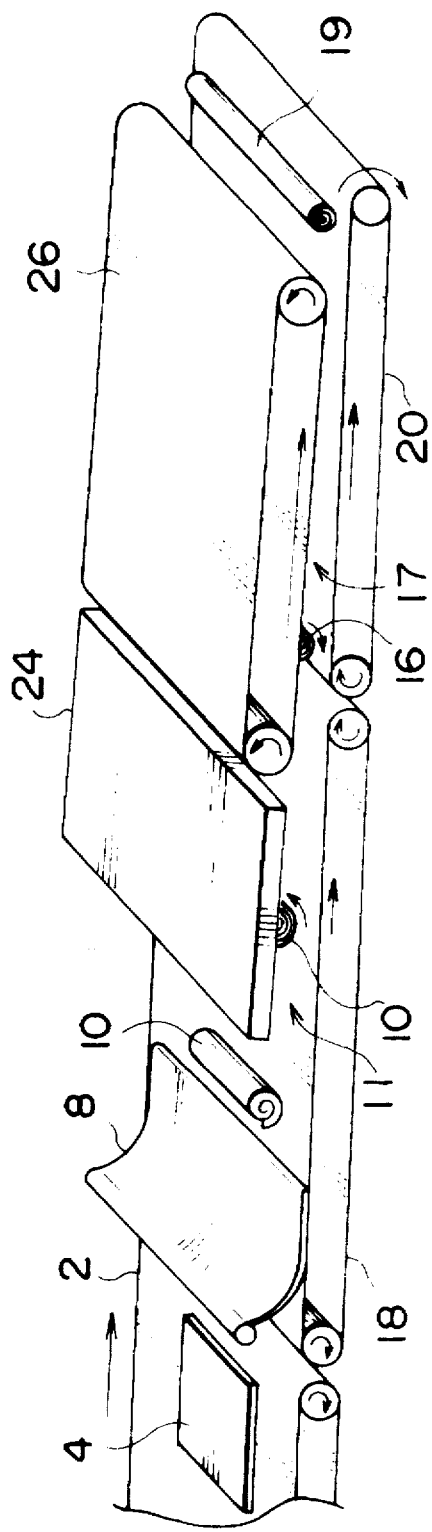
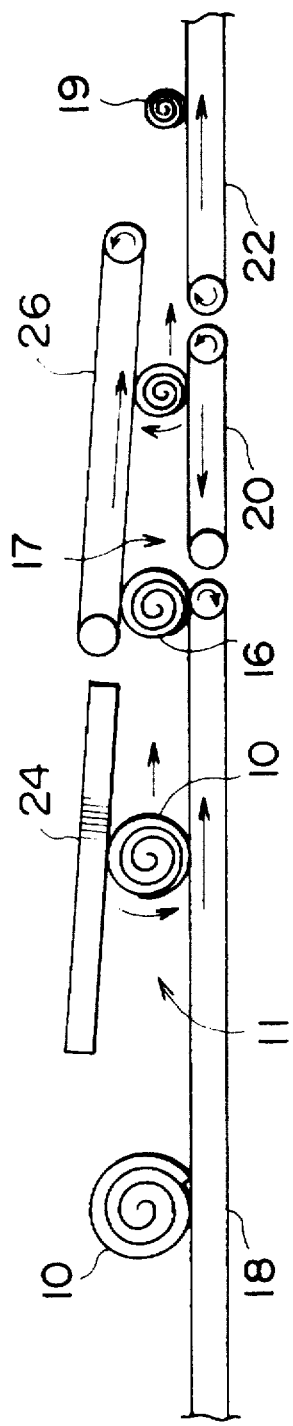

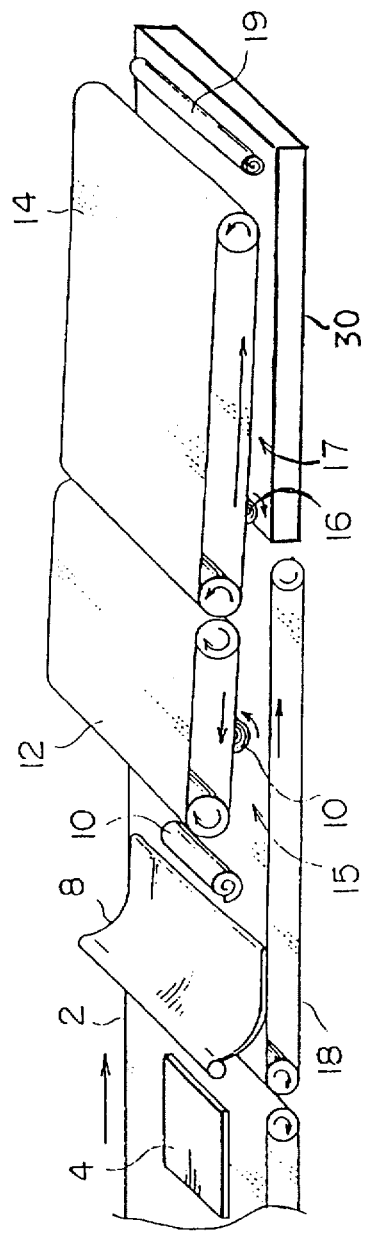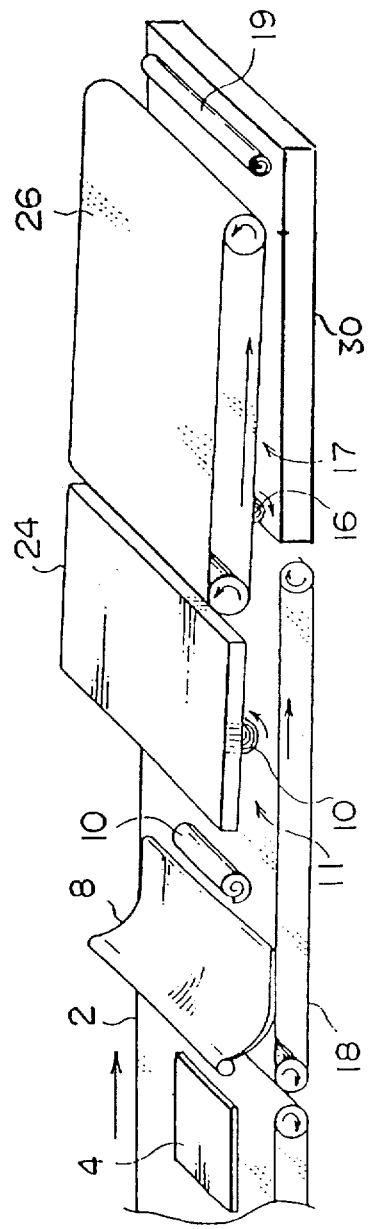

APPARATUS FOR SHAPING ELONGATED BAR-SHAPED BREAD DOUGH PIECES

BACKGROUND OF THE INVENTION

1. Field of the Invention

This invention relates to a method and apparatus for shaping elongated bar-shaped bread dough pieces. It especially relates to a method and apparatus in and by which bread dough pieces are shaped to bar-shaped bread dough pieces elongated in their axial direction to produce bar-shaped bread such as French rolls and hot dog rolls.

2. Prior Art

As a means relating to the above, an apparatus has been provided wherein a pressing board or belt is disposed above a conveyor that conveys divided dough pieces, so as to provide a desired gap between the pressing board or belt and the conveyor. The divided dough pieces are supplied into the gap, while being pressed and rolled, thereby producing elongated bar-shaped dough pieces, each being elongated in the axial direction of its rotation.

In shaping bar-shaped bread dough pieces, say, for French rolls, a dough mass is divided and cut into pieces at a prior stage. Each piece is then cut to a desired length. The cut dough piece is then pressed and rolled between the gap, thereby an elongated bar-shaped dough piece being shaped. In stretching the bar-shaped dough piece to elongate it in the axial direction, both its ends tend to be easily elongated as compared with its middle part. Therefore, the wound up bar-shaped dough piece is not uniformly elongated, but has a curved wound-dough end formed on the outer surface of and between the two ends of the bar-shaped dough piece. Thus, as shown in FIG. 11, the wound-dough end (the outer end of the dough that is wound about itself and that end forms a line in the axial direction of the wound-dough piece) of the elongated bar-shaped dough piece 28 does not have a straight line. Also, the wound dough has a residual stress that results from applying an outer force caused by rolling the dough piece. After baking such a dough piece, bar-shaped bread with a curvature or twist on its surface is produced. Therefore, defects have existed in that the bar-shaped dough piece had a bad appearance or a deformed shape due to the curvature of the dough piece resulting from a residual stress within the dough.

SUMMARY OF THE INVENTION

This invention is intended to resolve the above problems. It comprises passing a bread dough piece being conveyed, such as a preshaped bread dough roll, a bread dough sheet, or a divided dough mass, through a first gap formed by a conveying face and an opposing face, to thereby apply a first rotation to roll the bread dough pieces while applying pressure between said faces, thereby shaping an elongated bar-shaped bread dough piece. Then, it is fed into a second gap formed by two faces that face each other, to thereby apply to the elongated bar-shaped bread dough piece a second rotation in a direction opposite that of the first rotation. Namely, bread dough pieces are pressed and rolled by the first gap, and are reversely pressed and rolled by the second gap. Therefore, if a bread dough piece axially elongated by the first gap has a curved wound-dough end on its surface, the shape of the bread dough piece can be changed to a shape having no curved end, but having a straight end. Also, the problem of the residual stress within dough is resolved, by applying the second rotation.

By one aspect of this invention a method of shaping elongated bar-shaped bread dough pieces is provided. It comprises pressing and rolling a bread dough piece while conveying it downstream into a first gap between a conveying face and a face that faces it to apply a first rotation to said bread dough piece, thereby shaping an elongated bar-shaped dough piece, and pressing and rolling it while conveying it downstream in a second gap between two faces that face each other to apply a second rotation that is in a direction reverse to that of said first rotation to said elongated bar-shaped bread dough piece.

By another aspect of this invention an apparatus for shaping elongated bar-shaped bread dough pieces is provided. It comprises a conveyor, a first pressing belt forcibly driven by means of a motor or a pressing board disposed to face said conveyor to provide a first gap to press and roll a bread dough piece being conveyed downstream, said first pressing belt being moved reversely to the moving direction of said conveyor, the moving speed of said first pressing belt being less than that of said conveyor, the under surface of said pressing board being adapted to directly engage said bread dough piece, and a second pressing belt forcibly driven by means of a motor disposed downstream of said first pressing belt or said pressing board and above said conveyor to face it to provide a second gap to receive, press, and roll an elongated bar-shaped bread dough piece conveyed downstream from said first gap, said second pressing belt being moved in the same direction as that of said conveyor, the moving speed of said second pressing belt being higher than that of said conveyor.

By still another aspect of this invention an apparatus for shaping elongated bar-shaped bread dough pieces is provided. It comprises a first means comprising a first conveyor and a first pressing belt forcibly driven by means of a motor or a first pressing board disposed to face said first conveyor to provide a first gap to press and roll a bread dough piece conveyed downstream into said first gap, said first pressing belt being moved reversely to the moving direction of said first conveyor, the moving speed of said first pressing belt being less than that of said first conveyor, the under surface of said first pressing board being adapted to directly engage said bread dough piece, and second means disposed downstream of said first means and comprising a second conveyor or a second pressing board and a second pressing belt forcibly driven by means of a motor disposed to face said second conveyor or said second pressing board to provide a second gap to receive, press, and roll an elongated bar-shaped bread dough piece conveyed downstream from said first gap, the moving direction of said second pressing belt being the same as that of said first conveyor, said second conveyor being moved in the same direction as that of said second pressing belt, and the moving speed of said second pressing belt being higher than that of said second conveyor, the upper surface of said second pressing board being adapted to directly engage said bread dough piece.

By a still further aspect of this invention an apparatus for shaping elongated bar-shaped bread dough pieces is provided. It comprises a first means comprising a first conveyor and a first pressing belt forcibly driven by means of a motor or a first pressing board disposed to face said first conveyor to provide a first gap to press and roll a bread dough piece conveyed downstream into said first gap, said first pressing belt being moved reversely to the moving direction of said first conveyor, and the moving speed of said first pressing belt being less than that of said first conveyor, the under surface of said first pressing board being adapted to directly engage said bread dough piece, and a second means disposed downstream of and below said first means and comprising a second conveyor and a second pressing belt forcibly driven by means of a motor or a second pressing board disposed to face said second conveyor to provide a second gap to receive, press, and roll an elongated bar-shaped bread dough piece conveyed downstream from said first gap, said second conveyor being moved reversely to the moving direction of said first conveyor, said second pressing belt being moved reversely to the moving direction of said second conveyor, and the moving speed of said second pressing belt being less than that of said second conveyor.

BRIEF DESCRIPTION OF THE DRAWINGS

FIG. 5 is a schematic side view of a fifth embodiment of this invention.

FIG. 6 is a schematic side view of a sixth embodiment of this invention.

FIG. 7 is a schematic side view of a seventh embodiment of this invention.

FIG. 8 is a schematic side view of an eighth embodiment of this invention.

FIG. 12 is a schematic side view of a tenth embodiment of this invention.

FIG. 13 is a schematic side view of an eleventh embodiment of this invention.

PREFERRED EMBODIMENTS OF THE INVENTION

A first embodiment of this invention will now be explained by reference to the attached drawings.

Figure 1:
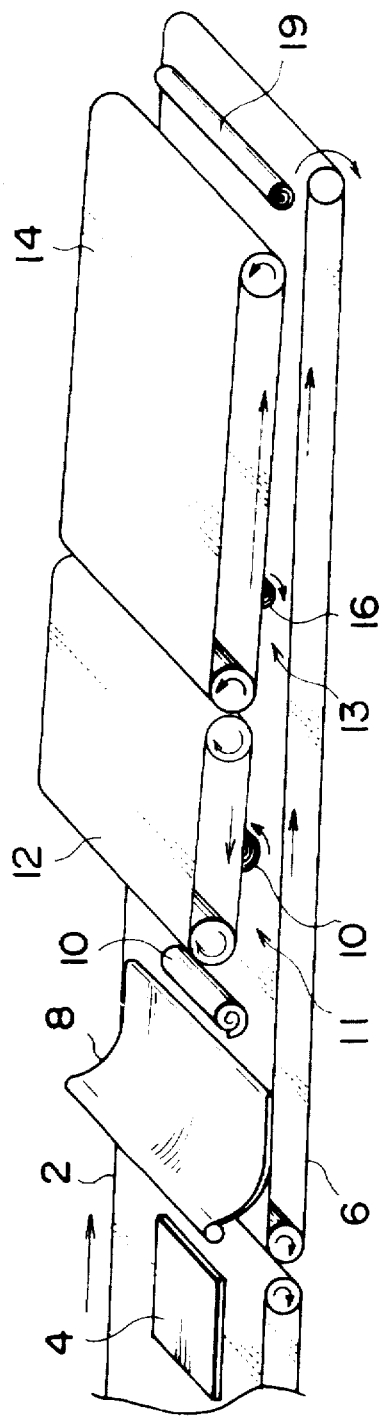
FIG. 1 is a schematic and perspective view of a first embodiment of this invention.

In FIG. 1 a conveyor 2 is disposed. It is adapted to be driven by means of a motor (not shown). The conveyor 2 conveys a bread dough sheet 4 downstream. A conveyor 6 is disposed downstream of the conveyor 2. This conveyor 6 is adapted to be driven by means of a motor (not shown). A winding-up means 8 is disposed above the upstream end of the conveyor 6. It is adapted to wind up bread dough pieces. A first pressing belt 12 is disposed above the conveyor 6 to provide a first gap 11 between the first pressing belt 12 and the conveyor 6. The first pressing belt 12 is adapted to be driven by means of a motor (not shown). A second pressing belt 14 is disposed downstream of the first pressing belt 12 and above the conveyor 6 to provide a second gap 13 between the second pressing belt 14 and the conveyor 6. The second pressing belt 14 is adapted to be driven by means of a motor (not shown).

The conveyor 2, the conveyor 6, the winding-up means 8, the first pressing belt 12, and the second pressing belt 14, are supported by arms (not shown) mounted on a frame (not shown). The gaps 11 and 13 and their inclinations can be adjusted.

The first gap 11 between the first pressing belt 12 and the conveyor 6 is adapted to decrease gradually in the downstream direction, and the second gap 13 between the second pressing belt 14 and the conveyor 6 is also adapted to decrease gradually in the downstream direction. The speed of the first pressing belt 12 is less than that of the conveyor 6, and the direction of rotation of the belt 12 is opposite that of the conveyor 6. The speed of the second pressing belt 14 is higher than that of the conveyor 6, and the direction of movement of the belt 14 is the same as that of the conveyor 6 where they face each other.

A preshaped bread dough roll 10 wound by means of the winding-up means 8 is pressed and rolled in the first gap 11, while being conveyed downstream. The first gap 11 between the first pressing belt 12 and the conveyor 6 decreases gradually in the downstream direction. Therefore, the preshaped bread dough roll 10 is pressed and rolled, while being conveyed downstream, between the first pressing belt 12 and the conveyor 6, and is elongated in the axial direction of the preshaped bread dough roll 10, whereby an elongated bar-shaped bread dough piece 16 is obtained. Then, the elongated bar-shaped bread dough piece 16 is conveyed between the second gap 13 between the second pressing belt 14 and the conveyor 6. The second gap 13, like the first gap 11, also decreases gradually in the downstream direction. Therefore, the elongated bar-shaped bread dough piece 16 is pressed and rolled downstream between the second pressing belt 14 and the conveyor 6, and is elongated in its axial direction, whereby a further elongated bar-shaped bread dough piece 19 is obtained.

Figure 10:
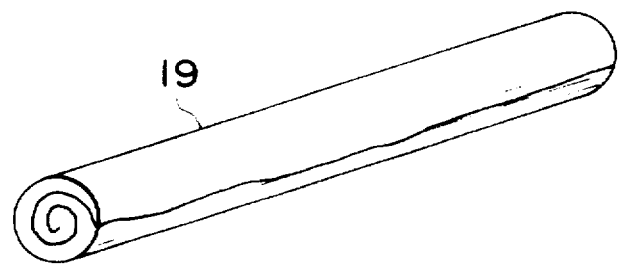
FIG. 10 shows an elongated bar-shaped dough piece 19 prepared by an embodiment of this invention.
Figure 11:
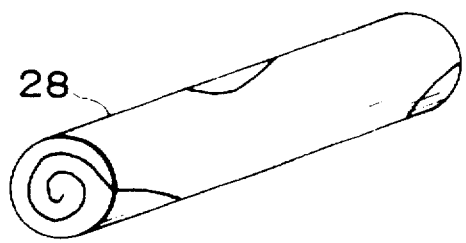
FIG. 11 shows an elongated bar-shaped bread dough piece 28 having a curved wound-dough end prepared by the prior-art apparatus.

The elongation of the middle part of the elongated bar-shaped bread dough piece 16, which is shaped in the first gap 11, is less than that of either end. Therefore, distortion appears in the elongated bar-shaped bread dough piece 16, and it causes a curved wound-dough end to be formed on the outer surface of the elongated bar-shaped dough piece 16, like the elongated bar-shaped dough piece 28. This dough piece 28 is prepared by means of the prior-art apparatus, and as shown in FIG. 11, the wound-dough end of this dough piece 28 does not form a straight line. However, this distortion disappears in the further elongated bar-shaped bread dough piece 19 coming out of the second gap 13, because the second gap 13 applies a reverse rotation to the elongated bar-shaped bread dough piece 16, so that, as shown in FIG. 10, its wound-dough end forms a straight line. Applying the second rotation to the elongated bar-shaped bread dough piece 16 does not require rewinding the dough piece, because each of the dough layers wound up by the first gap adheres to other layers.

A second embodiment of this invention will now be explained by reference to the attached drawings.

Figure 2:
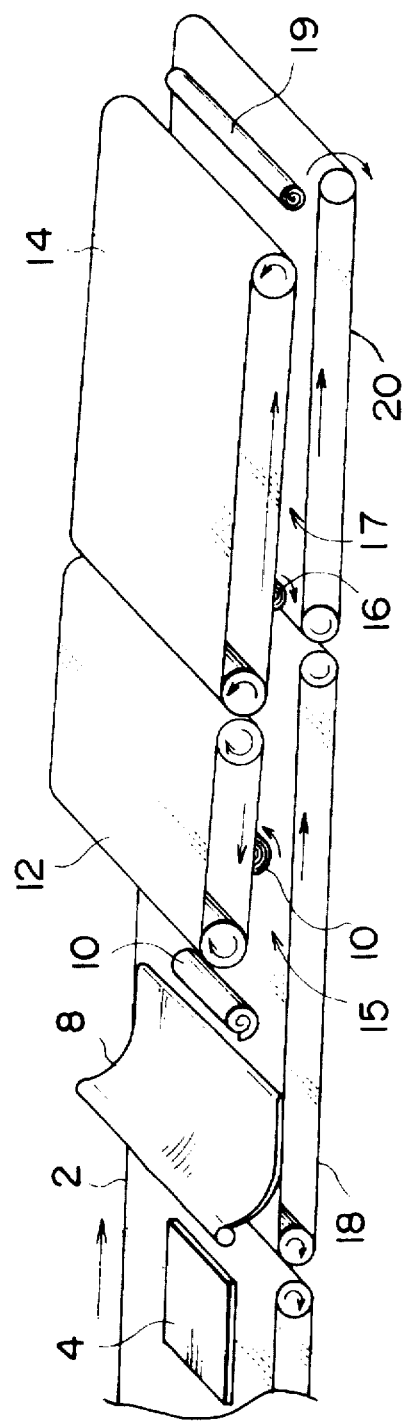
FIG. 2 is a schematic and perspective view of a second embodiment of this invention.

In FIG. 2, in place of the conveyor 6 in the first embodiment, a first conveyor 18 and a second conveyor 20 are disposed below the first pressing belt 12 and below the second pressing belt 14, respectively. The first conveyor 18 and second conveyor 20 are also supported by arms (not shown) mounted on a frame (not shown), and are adapted to be driven by means of motors (not shown). The first pressing belt 12 and the first conveyor 18 provide a first gap 15, and the second pressing belt 14 and the second conveyor 20 provide a second gap 17. The gaps 15 and 17 and their inclinations can be adjusted. The first gap 15 is adapted to decrease gradually in the downstream direction. The second gap 17 is also adapted to decrease gradually in the downstream direction, like the first embodiment. The speed of the first pressing belt 12 is less than that of the first conveyor 18, and the direction of rotation of the belt 12 is opposite that of the first conveyor 18. The speed of the second pressing belt 14 is higher than that of the second conveyor 20, and the direction of rotation of the belt 14 is the same as that of the second conveyor 20.

A preshaped bread dough roll 10 wound by means of the winding-up means 8 is pressed and rolled in the first gap 15, while being conveyed downstream. The preshaped bread dough roll 10 is pressed and rolled in the first gap 15, and is elongated in the axial direction of the preshaped bread dough roll 10, whereby an elongated bar-shaped bread dough piece 16 is obtained while being conveyed downstream. Then, the elongated bar-shaped bread dough piece 16 is fed into the second gap 17, where the second rotation is applied to the elongated bar-shaped bread dough piece 16, and a further elongated bar-shaped bread dough piece 19 is obtained. The same technical effects of the first embodiment can be attained.

A third embodiment of this invention will now be explained by reference to FIG. 3.

The structure of the apparatus used in this embodiment is the same as that of the second embodiment (see FIG. 2). However, the conveying direction of the second conveyor 20 is reverse that of the first conveyor 18. In this embodiment the second rotation, which is in a direction reverse to that of the first rotation, is also applied to the elongated bar-shaped bread dough piece 16, thereby a further elongated bar-shaped bread dough piece 19 being obtained. It is conveyed downstream by a conveyor 21.

In this embodiment, to have the elongated bar-shaped bread dough piece 16 contact the second pressing belt 14 before it contacts the second conveyor 20, the upstream end of the second pressing belt 14 extends above the downstream end of the first conveyor 18. Thus, the elongated bar-shaped bread dough piece 16 can be precisely transferred from the first gap 15 to the second gap 17. Also, to have the elongated bar-shaped bread dough piece 19 precisely fed from the second gap 17, the downstream end of the pressing belt 14 extends above the upstream end of the conveyor 22. The technical effects of the second embodiment can also be attained in this embodiment.

Figure 4:
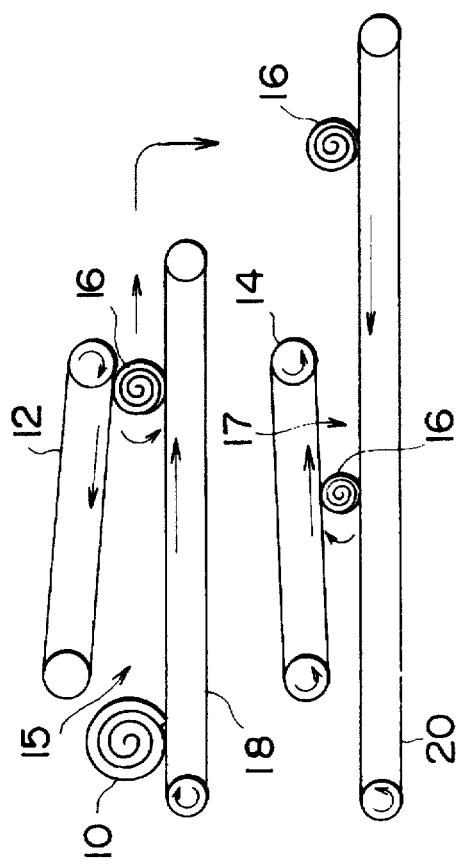
FIG. 4 is a schematic side view of a fourth embodiment of this invention.

A fourth embodiment of this invention will now be explained by reference to FIG. 4.

A first conveyor 18 conveying a preshaped bread dough roll 10 is disposed. A first pressing belt 12 is disposed above the first conveyor 18 to provide a first gap 15 between the first pressing belt 12 and the first conveyor 18. They constitute a first means. They are similar to the first means of FIG. 3.

A second means, comprising a second conveyor 20 and a second pressing belt 14, is disposed below the first means. The second conveyor 20 and second pressing belt 14 provide a second gap 17. The upstream end of the second conveyor 20 extends so that the elongated bar-shaped bread dough piece 16 falling from the downstream end of the first conveyor 18 can be received by the second conveyor 20. Alternatively, in place of an extended upstream end of the second conveyor, any means to guide the dough piece to the upstream end of the second conveyor 20 may be disposed to ensure that the elongated bar-shaped bread dough piece 16 conveyed from the first conveyor 18 reaches the second conveyor 20.

The first gap 15 between the first pressing belt 12 and the first conveyor 18 is adapted to decrease gradually in the downstream direction. The second gap 17 between the second pressing belt 14 and the second conveyor 20 is also adapted to decrease gradually in the downstream direction. The speed of the first pressing belt 12 is less than that of the first conveyor 18, and the moving direction of the first pressing belt 12 is opposite that of the first conveyor 18. The speed of the second pressing belt 14 is less than that of the second conveyor 20. The moving direction of the second pressing belt 14 is opposite that of the second conveyor 20.

A preshaped bread dough roll 10 is pressed and rolled between the first pressing belt 12 and the first conveyor 18, and is elongated in the axial direction of the preshaped bread dough roll 10, whereby an elongated bar-shaped bread dough piece 16 is discharged from the first gap 15. Then, the elongated bar-shaped bread dough piece 16 falls onto the second conveyor 20, and is fed into the second gap 17. As in the first gap 15, it also decreases gradually in the downstream direction. Therefore, the elongated bar-shaped dough piece 16 is pressed and rolled, and is further elongated in its axial direction, whereby a further elongated bar-shaped bread dough piece 19 is obtained. The technical effects of the previous embodiments can also be attained in this embodiment.

A fifth embodiment of this invention will now be explained by reference to FIG. 5.

Figure 3:
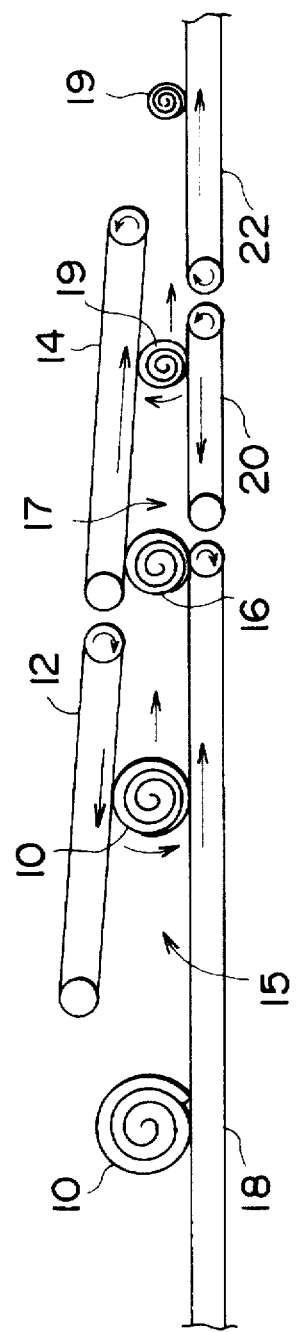
FIG. 3 is a schematic side view of a third embodiment of this invention.

The apparatus used in this embodiment is similar to that of the third embodiment (see FIG. 3). However, a first gap 9 is adapted to increase gradually in the downstream direction. Therefore, a bread dough sheet 4 can be directly fed into the gap 9 and is wound up to be a preshaped bread dough roll 10, while being pressed in the first gap 9. The first gap 9 allows the preshaped bread dough roll 10 to advance. Its diameter gradually increases, in the downstream direction. Namely, the bread dough sheet 4 can be wound up in the first gap 9, and simultaneously it is elongated in its axial direction. This way can provide a technical effect whereby a bread dough sheet is preshaped at the first stage of the preceding embodiments. Thus, the bread dough sheet 4 becomes the preshaped bread dough roll 10, and it becomes an elongated bread dough piece 16 in the first gap 9. This elongated bread dough piece 16 is then fed into the second gap 17. In this gap the elongated bread dough piece 16 receives the second rotation in a direction reverse to that of the first time, so that the curvature of the wound-dough end of the elongated bread dough piece 16 is eliminated, and a further elongated bread dough piece 19 is obtained. The wound-dough end of the dough piece 19 has an almost straight line.

A sixth embodiment of this invention will now be explained by reference to FIG. 6.

The apparatus used in this embodiment is the same as that of the first embodiment (see FIG. 1) except for the first pressing belt 12. In this embodiment, in place of the first pressing belt 12, a pressing board 24 is used. It may be made of a metal or plastic plate. To avoid a piece of dough adhering to the pressing board's surface, cloth or some other material is usually attached to it to decrease adhesion to the dough. The pressing board 24 is stationary. However, since it holds the preshaped bread dough roll 10 and the conveyor 6 causes it to be rolled, it is conveyed downstream. The pressing board is supported by arms (not shown) mounted on a frame (not shown), and adapted so that the first gap 11 and its inclination can be adjusted. The preshaped bread dough roll 10 is pressed and rolled between the pressing board 24 and the conveyor 6, while being subjected to the first rotation. Then, an elongated bar-shaped bread piece 16 is produced, and it is fed into a second gap 13, thereby further elongating a bar-shaped bread piece 19. The technical effects of the previous embodiments can also be attained in this embodiment.

A seventh embodiment of this invention will now be explained by reference to FIG. 7.

The apparatus used in this embodiment is the same as that of the sixth embodiment (see FIG. 6), except that a first conveyor 18 and a second conveyor 20 are disposed below the pressing board 24 and a pressing belt 26. In this embodiment, in place of the second conveyor 20 a second pressing board may be disposed. In any event, in this embodiment the technical effects of the previous embodiments can also be attained.

An eighth embodiment of this invention will now be explained by reference to FIG. 8.

The structure of the apparatus used in this embodiment is substantially the same as that of the seventh embodiment. However, the conveying direction of the second conveyor 20 is reverse that of the first conveyor 18. Since the moving speed of the pressing belt 26 is higher than that of the second conveyor 20, the elongated bread dough piece 16 is allowed to advance in the gap 17 in the downstream direction, while being rotated by the second rotation. In this embodiment, in place of the second conveyor 20, a second pressing board can also be disposed. In any event, in this embodiment the technical effects of the previous embodiments can also be attained.

Figure 9:
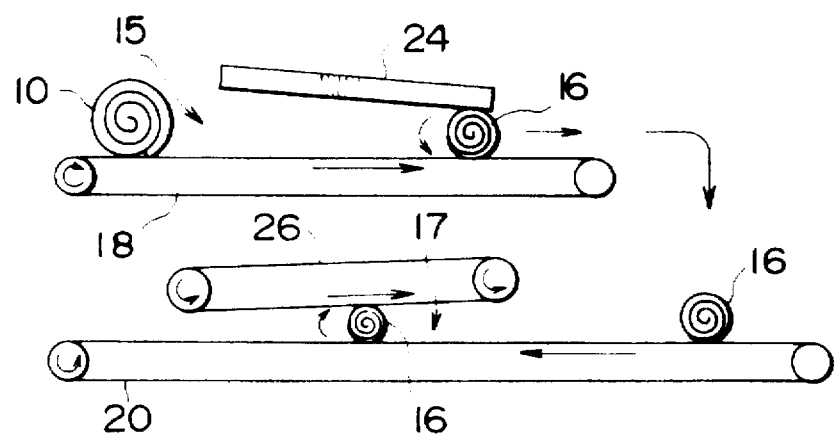
FIG. 9 is a schematic side view of a ninth embodiment of this invention.

A ninth embodiment of this invention will now be explained by reference to FIG. 9.

The apparatus used in this embodiment is the same as that of the fourth embodiment (see FIG. 4) except that the first pressing belt 12 is replaced with a pressing board 24. The technical effects of the fourth embodiment can also be attained.

In the embodiments of this invention the first and second gaps are adapted to decrease gradually in the downstream direction. However, the second gap may be one that has a constant value from the upstream end to the downstream end of the second conveyor 20. Thereby the preshaped dough roll 10 is elongated at the first gap, but the elongated bar-shaped bread dough piece 16 is not elongated at the second gap. The second gap only causes the elongated bar-shaped bread dough piece 16 to roll, whereby the residual stress within the dough is made to disappear.

A tenth embodiment of this invention will now be explained by reference to FIG. 12.

The apparatus used in this embodiment is the same as that of the second embodiment (see FIG. 2) except that the second conveyor 20 is replaced by a pressing board 30. In any event, in this embodiment the technical effects of the previous embodiments can also be attained.

An eleventh embodiment of this invention will now be explained by reference to FIG. 13.

The apparatus used in this embodiment is the same as that of the seventh embodiment (see FIG. 7) except that the second conveyor 20 is replaced by a second pressing board 30. In any event, in this embodiment the technical effects of the previous embodiments can also be attained.

As stated above, this invention comprises passing a preshaped bread dough roll or a bread dough sheet being conveyed through a first gap formed by a conveying face and a first face provided opposite the conveying face, to thereby roll the preshaped bread dough roll or bread dough sheet while applying a pressure between the faces, thereby shaping an elongated bar-shaped bread dough piece, and passing it through a second gap formed by two faces facing each other, to thereby apply to the elongated bar-shaped bread dough piece a rotation that is in a direction opposite that at the first gap. Therefore, in shaping an elongated bar-shaped bread dough piece for French rolls, hot dogs, or such, this invention provides a method and apparatus to maintain the straight wound-dough end, so as to produce dough pieces which are not deformed or twisted so that a cylindrical dough piece is produced when they are baked. Thus, the quality of the final product can be improved.

We claim:

1. An apparatus for shaping elongated bar-shaped bread dough pieces comprising:

a conveyor, a first pressing belt forcibly driven by means of a motor or a pressing board disposed to face said conveyor to provide a first gap to press and roll a bread dough piece being conveyed downstream, said first pressing belt being moved reversely to the moving direction of said conveyor, the moving speed of said first pressing belt being less than that of said conveyor, the under surface of said pressing board being adapted to directly engage said bread dough piece, and a second pressing belt forcibly driven by means of a motor disposed downstream of said first pressing belt or said pressing board and above said conveyor to face it to provide a second gap to receive, press, and roll an elongated bar-shaped bread dough piece conveyed downstream from said first gap, said second pressing belt being moved in the same direction as that of said conveyor, the moving speed of said second pressing belt being higher than that of said conveyor.

2. An apparatus for shaping elongated bar-shaped bread dough pieces comprising:

a first means comprising a first conveyor and a first pressing belt forcibly driven by means of a motor or a first pressing board disposed to face said first conveyor to provide a first gap to press and roll a bread dough piece conveyed downstream into said first gap, said first pressing belt being moved reversely to the moving direction of said first conveyor, the moving speed of said first pressing belt being less than that of said first conveyor, the under surface of said first pressing board being adapted to directly engage said bread dough piece, and a second means disposed downstream of said first means and comprising a second conveyor or a second pressing board and a second pressing belt forcibly driven by means of a motor disposed to face said second conveyor or said second pressing board to provide a second gap to receive, press, and roll an elongated bar-shaped bread dough piece conveyed downstream from said first gap, the moving direction of said second pressing belt being the same as that of said first conveyor, said second conveyor being moved in the same direction as that of said second pressing belt, and the moving speed of said second pressing belt being higher than that of said second conveyor, the upper surface of said second pressing board being adapted to directly engage said bread dough piece.

3. The apparatus of claim 2, further comprising means for moving said second conveyor reversely to the moving direction of said second pressing belt.

4. The apparatus of claim 3, wherein the upstream end of said second pressing belt extends above said first conveyor.

5. An apparatus for shaping elongated bar-shaped bread dough pieces comprising:

a first means comprising a first conveyor and a first pressing belt forcibly driven by means of a motor or a first pressing board disposed to face said first conveyor to provide a first gap to press and roll a bread dough piece conveyed downstream into said first gap, said first pressing belt being moved reversely to the moving direction of said first conveyor, and the moving speed of said first pressing belt being less than that of said first conveyor, the under surface of said first pressing board being adapted to directly engage said bread dough piece, and a second means disposed downstream of and below said first means and comprising a second conveyor and a second pressing belt forcibly driven by means of a motor or a second pressing board disposed to face said second conveyor to provide a second gap to receive, press, and roll an elongated bar-shaped bread dough piece conveyed downstream from said first gap, said second conveyor being moved reversely to the moving direction of said first conveyor, said second pressing belt being moved reversely to the moving direction of said second conveyor, and the moving speed of said second pressing belt being less than that of said second conveyor.

6. The apparatus of claim 5, wherein the upstream end of said second conveyor extends to a position to receive an elongated bar-shaped bread dough piece conveyed downstream from said first gap.

* * * * *